Apr. 24, 1923.  1,453,005
D. T. CONSIDINE
CRATE
Filed May 15, 1922  2 Sheets-Sheet 2

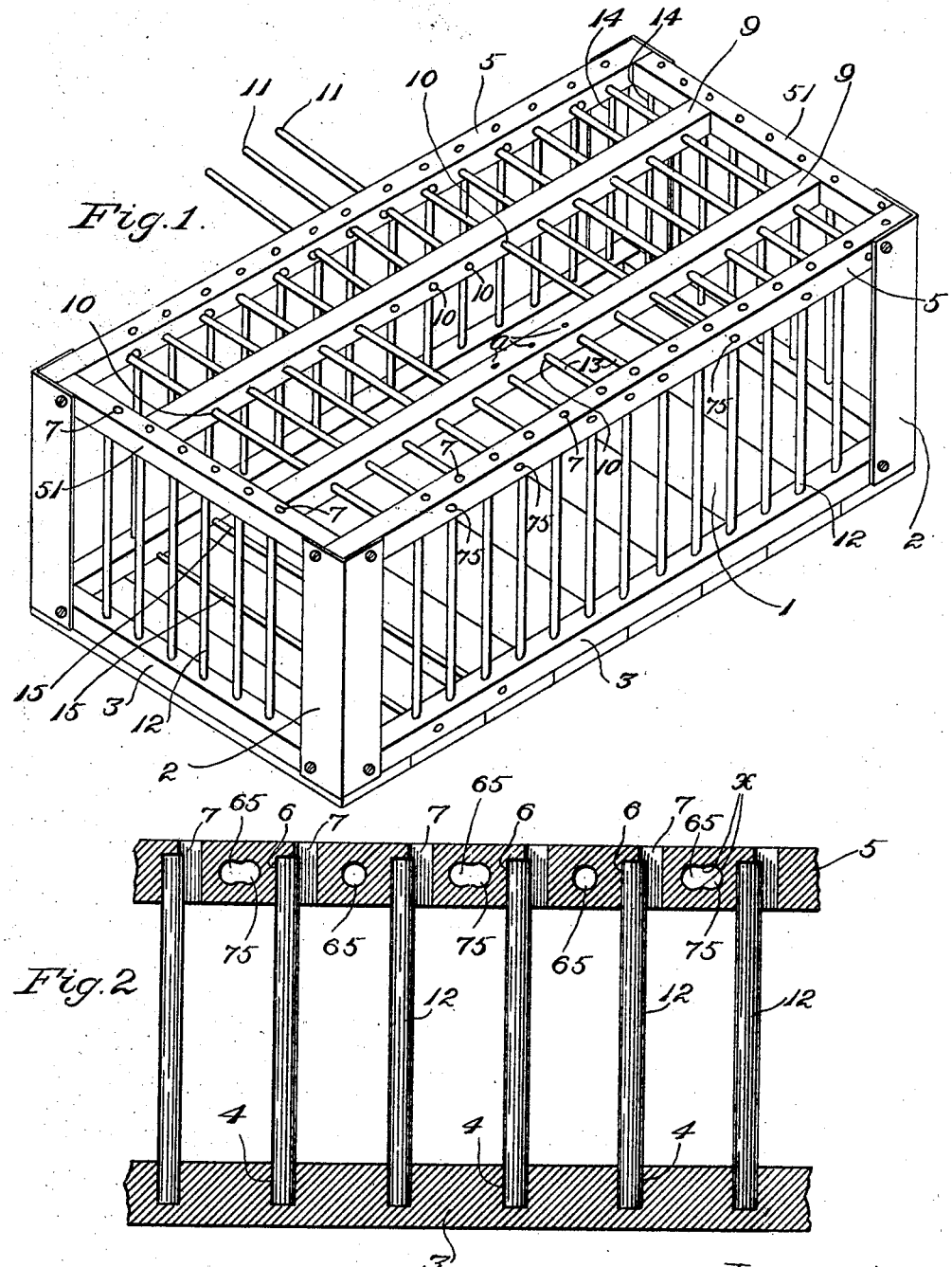

Witness:
Oscar F. Hill

Inventor:
Daniel T. Considine
by Chas. F. Randall
Attorney

Patented Apr. 24, 1923.

1,453,005

UNITED STATES PATENT OFFICE.

DANIEL T. CONSIDINE, OF WATERTOWN, MASSACHUSETTS.

CRATE.

Application filed May 15, 1922. Serial No. 560,865.

*To all whom it may concern:*

Be it known that I, DANIEL T. CONSIDINE, a citizen of the United States, residing at Watertown, in the county of Middlesex, State of Massachusetts, have invented a certain new and useful Improvement in Crates, of which the following is a specification, reference being had therein to the accompanying drawings.

My invention has relation to crates, and in particular to poultry and small animal crates, shipping cases, and the like containers, such as are made with openwork sides and top composed of rods or staves spaced apart at suitable intervals.

Crates thus made with openwork walls and tops are well-known and extensively used for the above-named purposes, since the construction makes it possible to economize in the amount of material required for making the articles, and to save in the cost of transportation, while affording plentiful ventilation to the contents. The material most commonly used in these openwork or latticed sides is wood cut into rods or thin, narrow strips. These are more or less liable to breakage. The methods of construction commonly adopted in practice for securing the rods or staves in place make repairs comparatively expensive, and render impracticable a hasty repair when in transit except in rude or rough shape. If such be attempted, the broken parts and the nail-ends, wire, or other makeshift fastenings, endanger the contents and the hands of the handlers. Further, the loss to the owner of the crates is considerable, through relatively small breakages of the openwork rendering the crates useless.

The main object of my invention is to provide a crate of a construction enabling the members comprising the openwork of the sides and top to be instantly removed or replaced, whenever desired or necessary, without the use of tools or fastening devices of any sort.

Another object of my invention is to produce a strong, light crate which can be manufactured as cheaply as crates of the common types can be, shipped in flat or knocked-down form, and can be easily and quickly assembled by the buyer, and thus put into the latter's hands at a lower figure than those that must be shipped in erected shape.

My invention consists, essentially, in a crate or crate-like container comprising a framework, and a plurality of rods or staves each removably supported by two or more members of said framework, by rod- or stave-retaining means consisting of a socket in connection with one member of such framework for positioning a rod or stave, a hole through another member of said framework offset with respect to the said socket, and a second socket, in a second member of the framework, intersected by the said hole, and in line with said first-named socket, and into which the corresponding end of the rod or stave springs when pushed longitudinally into position.

The invention also provides for withdrawal of the necessary number of rods or staves for the production of an opening or doorway to permit of the introduction of poultry, animals, or merchandise into a crate, and removal therefrom.

Two illustrative embodiments of my invention are shown in the accompanying drawings, in which:—

Fig. 1 is a perspective of a crate made according to my invention.

Fig. 2 is a detail showing the rod- or stave-retaining means constituting the substance of my invention.

Having reference to the drawings,—

Figure 3:
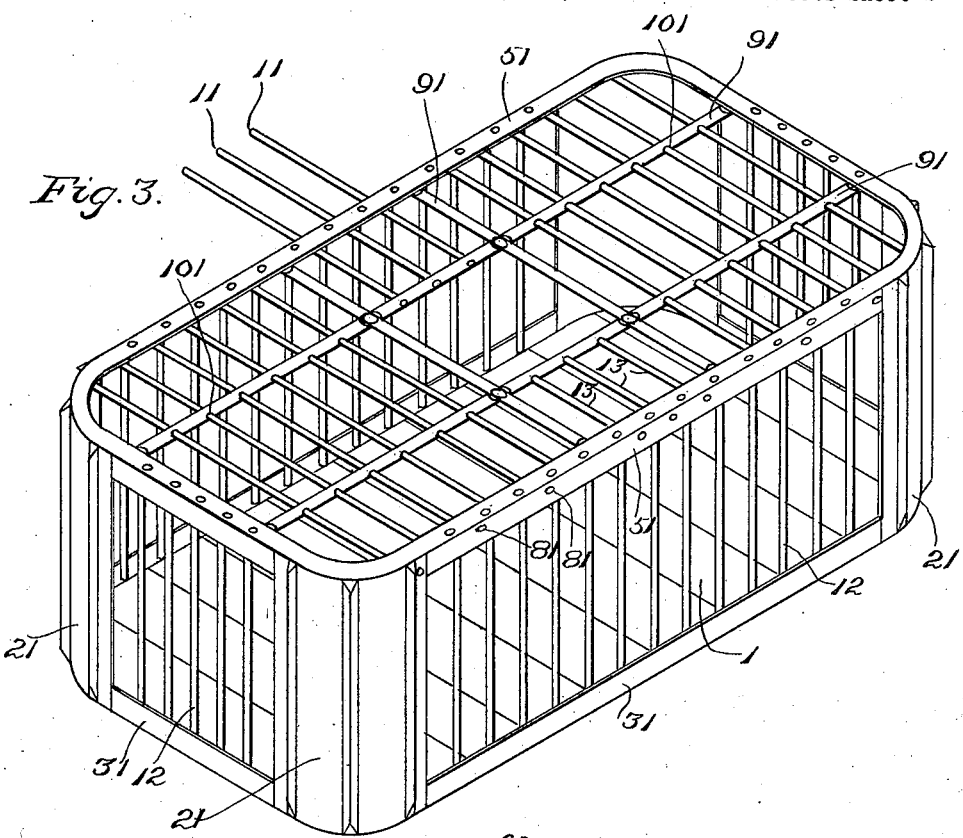
Fig. 3 is a detail showing an alternative form of construction of the crate, using a metal framework.

The shape or size of the crate or container is immaterial. In the case of the crate shown in Figs. 1 and 2, which is the preferred form, the members comprising the framework and the boards of the bottom or floor are of common material, of stock sizes and such as may easily be obtained. In the said crate, designed primarily as a poultry crate, the floor 1 is solid to protect the feet of the poultry from injury, and is secured to the lower frame-members in suitable manner, as by nails. Preferably but not necessarily the corners are reinforced by metal angle-plates 2, 2. In carrying out my invention, the openwork of the sides and top may be satisfactorily made of wooden rods, either round (as shown) or square in cross-section, except in cases where more than average sturdiness of the crate is required, where staves or slats oblong in cross-section may be substituted for rods, the method of application being the same as that which will be described in connection with the use of rods.

The crate shown in Figs. 1 and 2 comprises four lower members 3, 3, all formed with vertical sockets 4, 4, into which the ends of the rods fit sufficiently tightly and deeply to hold them stiffly at right angles to the members 3, 3. These vertical sockets may be formed in any way so long as they will allow the rods to enter but not pass through; they may be cut only partway through the frame-members 3, 3, or they may be extended wholly therethrough and be closed by the boards composing the floor 1. Corresponding sockets 6, 6, are cut in the under side of the outside upper frame-members 5, 5, 51, 51, each extending only partway through the frame-member, and axially in line with the corresponding socket in the lower frame-members 3. Adjacent the upper sockets 6, 6, so closely as to "overlap" the said sockets when viewed from above, are holes 7, 7, passing entirely through the frame-members 5, 5, 51, 51. As a consequence of the said "overlapping" these holes intersect or open into the sockets 6, 6, in a manner easily understood by reference to the representation in Fig. 2 of certain of the horizontal sockets 65 and holes 75 in an upper frame-member 5. These holes 7, 7, are of dimensions just sufficient to allow the rods to pass freely lengthwise through them. They are located slightly out of line with the corresponding sockets in the opposite cooperating members 3, the offsetting being preferably in a direction lengthwise of the upper frame-members 5, 5, 51, 51.

The rods 12, 12, preferably though not necessarily of wood, are each of a length just sufficient to be received within the two co-acting sockets 4 and 6 of a coordinated pair of frame-members; that is, they are substantially equal in length to the distance between the upper and lower frame-members of such pair, plus the combined depth of the two sockets 4 and 6, top and bottom. They are applied by entering them longitudinally from above through the holes 7, 7, in the upper member or bar, springing their lower ends sidewise and entering them into the sockets 4, 4, in the lower members or bar, and pushing or pulling them as far as they will go into these lower sockets 4, 4, so that the upper ends descend below the tops of the upper sockets 6, 6, aligned with the lower sockets 4, 4. Thereupon the effort of the rods to resume their natural straight extent springs their upper ends laterally into the upper sockets 6, 6, and they are locked in place. For added security, if desired, the axes of the adjoining holes 6 and 7 may be spaced apart far enough to increase the prominences marked $x$ at the lines of juncture, shown in Fig. 2 in the case of the horizontal sockets and holes aforesaid in upper bar 5. Then the rod must be pressed home laterally by hand, but will snap securely into place.

The rods can be removed instantly by the hands alone, by a process of removal which is the reverse of the applying process, and which will be evident.

The top of the crate is formed of horizontal rods which are applied and secured in place in connection with the front and rear frame-members 5, 5, by the same means as the vertical rods are applied and secured in place in connection with the frame-members 3 and 5, and likewise are removed in the same manner as the said vertical rods. In Fig. 2, the end-sockets in the upper frame-member 5 are marked 65, 65, and the through-holes are marked 75, 75. In order to weaken the front and rear upper frame-members 5, 5, as little as possible by the formation of the two series of sockets and through-holes therein, the horizontal sockets and rods for the top rods are located in alternation with the vertical sockets and through-holes for the vertical rods. In addition, instead of forming all the horizontal through-holes in the same frame-member 5, I prefer to form them in an alternating sequence in the two frame-members 5, 5; that is to say, every other horizontal through-hole in one of the said frame-members and the alternate ones in the other of said frame-members. This will be apparent from Fig. 2. Thus, every other horizontal rod is inserted and removed at the front of the crate; the alternate ones are inserted and removed at the back of the crate.

Intermediate reinforcing frame-members 9, 9, at the top of the crate are formed with through-holes 10, 10, through which the horizontal rods pass.

Because of the ease and celerity with which the rods may be applied and removed, and the security with which they are held, I purpose to obtain access to the inside of the crate by partially withdrawing as many of the rods forming the top, or one of the sides if need be, as may be necessary to create an opening of adequate size. This feature is of value to expedite the handling of poultry and the like. It may be noted that when an opening is thus made at any desired point in one of the sides, poultry and the like can betake themselves out of the crate unaided, instead of having each to be grasped and lifted out of the center opening usually provided in the top of prior crates.

To provide for an intermediately located or "center" opening in the top, I propose to substitute in one of the intermediate frame-members 9 sockets at opposite sides thereof instead of certain of the through-holes 10, 10, (or by converting the same number of said through-holes into pairs of sockets at opposite sides of such intermediate member by means of a nail *a* or the like passing transversely across each of the said holes 10, 10). I employ a plurality of short rods 13, 13, at one side of the said intermediate frame-member, engaging in this instance with the latter and with the front top frame-member 5, and also a plurality of other rods 11, 11, of intermediate length occupying the through-holes in the other intermediate frame-member and engaged at their ends with the rear top frame-member 5 and with the first intermediate frame-member. To obtain a central opening, the rods 11, 11, are disengaged from the sockets in the rear upper frame-member 5 and partly withdrawn, as illustrated in Fig. 1.

As stated above, in cases where exceptional strength is required of the crate, slats or staves may be used instead of rods, the use and method of application being the same in principle as that described for the rods.

Figures 4, 5:
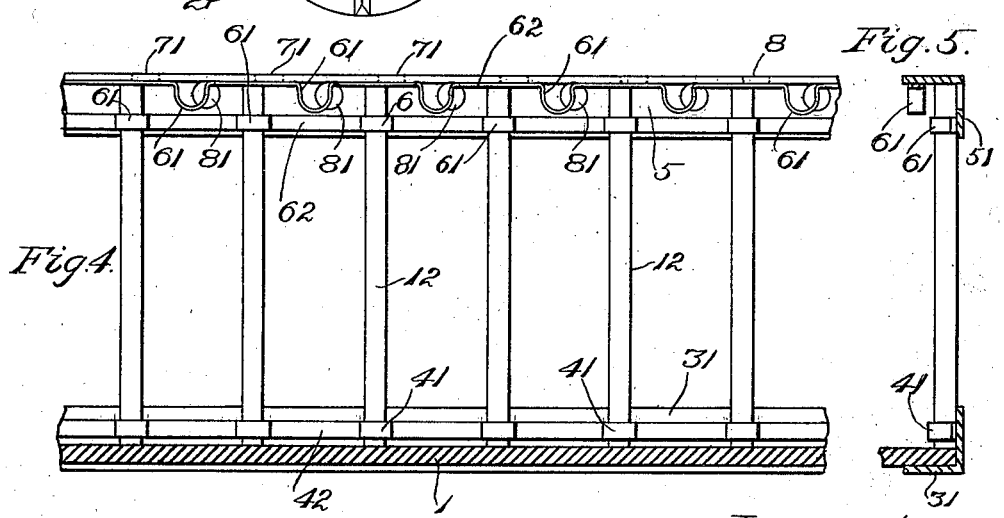
Figs. 4 and 5 show a modified construction of rod- or stave-retaining means which is employed in the crate shown in Fig. 3.

The embodiment of my invention shown in Figs. 3 to 5 is one wherein a metal framework made of angle iron, with heavily reinforced and corrugated metal corners 21, 21, is employed, for use where greater strength is requisite. The principles described above for the wooden crate are utilized in this embodiment, the sockets being provided by forming loops 41, 41, and 61, 61, in strips of metal ribbon 42, 42, 62, 62, secured at intervals on the inner surfaces of the angle irons 31, 51, of which the side and end bars of the bottom and top frame-members are composed. The through-holes 71 and 81 are formed in the respective flanges of the angle iron or irons constituting the top frame-member or members. The floor 1 is held down in place upon the horizontal flange or flanges of the angle iron or irons constituting the lower frame-member or members, by the bottom ends of the side rods 12, which rest upon it. A structure of intermediate frame-members 91, 91, is embodied in the top of this embodiment, through-holes 101, 101, being made in those intermediate frame-members which extend from one end of the crate to the other.

What is claimed as the invention is,—

1. A crate or crate-like container comprising oppositely located frame-bars in pairs, and openwork composed of rods or staves, one frame-bar of each pair having a series of sockets for the corresponding ends of the rods or staves, and the other frame-bar of the pair having a second series of sockets, alined with those of the first bar, for the other ends, and also having through-holes disalined with but intersecting such sockets, whereby the rods or staves may be inserted by way of the said through-holes into the two series of sockets and by reason of the engagement of one set of their ends in the sockets of the first series their other ends will spring into the second series of sockets, out of register with the through-holes, and the rods or staves will be held from accidental endwise displacement.

2. A crate or similar container comprising a frame having upper and lower frame-bars in pairs, and openwork sides composed of vertical rods or staves, the lower frame-bar of each pair having sockets for the lower ends of the vertical rods or staves, and the upper frame-bar of the pair having holes extending completely therethrough disalined from the companion holes in the lower bar through which the vertical rods or staves may be inserted lengthwise, and also having at its under side adjacent sockets in line with the sockets in the lower bar, thereby enabling the said vertical rods or staves to be inserted through the said through-holes in the upper bar and to occupy positions with their ends in the sockets of the opposite frame-bars.

3. A crate or similar container comprising a framework and a plurality of rods or staves each removably supported by two or more members of said frame-work, by rod- or stave-retaining means consisting of a socket in connection with one member of such framework for positioning a rod or stave, a hole through another member of said framework offset with respect to the said socket, and a second socket, intersected by the said hole, and in line with said first-named socket, and into which the corresponding end of the rod or stave springs when pushed longitudinally into position.

4. In a crate or similar container, an openwork or lattice composed of rods or staves, and supporting bars having retaining means for the respective rods or staves comprising a socket for one end of a rod or stave, a co-aligned socket for the other end thereof, and an offset through-hole in one of said bars in lateral communication with the latter socket.

5. In a crate or similar container, an openwork or lattice composed of rods or staves, and supporting bars having retaining means for the respective rods or staves comprising a socket in one of such bars for one end of a rod or stave, a co-aligned socket in another of the bars for the other end thereof, an offset through-hole in one of said bars in lateral communication with the latter socket, and a through-hole in an intermediate bar, access being had to the interior of the crate by disengaging the desired number of rods or staves and withdrawing them at least through the intermediate bar.

In testimony whereof I affix my signature in presence of two witnesses.

DANIEL T. CONSIDINE.

Witnesses:
CHAS. F. RANDALL,
ELLEN O. SPRING.